March 3, 1953 N. L. HEIKES ET AL 2,630,485

COLOR TELEVISION APPARATUS

Filed Sept. 11, 1950 7 Sheets-Sheet 1

INVENTORS
Norman L. Heikes &
BY Robert J. Stahl
Lippincott & Smith
ATTORNEYS

INVENTORS
Norman L. Heikes &
BY Robert J. Stahl
Lippincott & Smith
ATTORNEYS

March 3, 1953 N. L. HEIKES ET AL 2,630,485
COLOR TELEVISION APPARATUS
Filed Sept. 11, 1950 7 Sheets-Sheet 3

INVENTORS
Norman L. Heikes &
BY Robert J. Stahl
Lippincott + Smith
ATTORNEYS

March 3, 1953 N. L. HEIKES ET AL 2,630,485

COLOR TELEVISION APPARATUS

Filed Sept. 11, 1950 7 Sheets-Sheet 4

INVENTORS
Norman L. Heikes &
BY Robert J. Stahl
Lippincott & Smith
ATTORNEYS

INVENTORS
Norman L. Heikes &
Robert J. Stahl
BY Lippincott + Smith
ATTORNEYS

INVENTORS
Norman L. Heikes &
BY Robert J. Stahl
Lippincott & Smith
ATTORNEYS

March 3, 1953 N. L. HEIKES ET AL 2,630,485

COLOR TELEVISION APPARATUS

Filed Sept. 11, 1950 7 Sheets-Sheet 7

INVENTORS
Norman L. Heikes &
BY Robert J. Stahl
Lippincott & Smith
ATTORNEYS

UNITED STATES PATENT OFFICE 2,630,485

COLOR TELEVISION APPARATUS

Norman L. Heikes, San Francisco, and Robert J. Stahl, Redwood City, Calif., assignors to Color Television Incorporated, San Francisco, Calif., a corporation of California Application September 11, 1950, Serial No. 184,186

43 Claims. (Cl. 178—5.4)

This invention relates to color television apparatus. It is particularly concerned with the camera and studio equipment by which an image is picked up and then converted into electrical signals for transmission to monitor and reception points.

In the past it has been found that the color images produced from purely electronic color television operations have been subject to misregistration of the separate color images. Such difficulties have impaired greatly the observed image quality and system fidelity. As far as applicants are aware, it has heretofore been customary, in color television operations utilizing the electronic apparatus of any so-far demonstrated proposals, whether for the so-called sequential or the so-called simultaneous operations, to direct the optical image upon the camera or pick-up tubes in such way that the image is split into a plurality of separate component color images for color analysis. These separate images may be directed to completely separate camera tubes or form separate image areas upon a single camera tube. The produced signal output representing the image in each of the selected component colors then may be developed from either a single or multiplicity of camera tubes operating in cooperation one with the other.

With respect to the sequential types of polychrome operation, the component colors chosen for color analysis should be those which add to produce white. For a tricolor additive system, the selected component colors into which the image is analyzed usually comprise red, green and blue. Simultaneous operations are such that the three separate images may represent either additive component colors, as above, or, in the alternative, the subtractive component colors may be chosen, since the simultaneous system adapts itself to subtractive operations. The component colors selected for the latter type of operation usually are the complementaries of the additive component colors. Thus they are xanth (yellow), cyan (blue-green) and magenta (blue-red).

In the camera operation where separated image areas in the same tube or in completely different tubes must be scanned to realize the tricolor image analysis it is apparent that each scanning operation must be precisely similar if the separately scanned component color images are to generate signals able to create satisfactory replicas at receiving points. Practical considerations, such as operating parameters, tube geometry, optical distortion, keystoning, barrelling, pin-cushioning, and many other effects make the desired degree of registration almost, if not wholly, impossible of attainment in apparatus of the form so far described in the literature and yet demonstrated.

In view of these circumstances, the present invention provides camera apparatus wherein an electronic scanning operation is attainable while still completely avoiding registration difficulties. To this end a single image only is directed for analysis purposes upon the light-sensitive target of a camera tube. This image is passed through a suitable optical or color filter formed of a grid-like structure having a plurality of adjacent areas, conveniently in the form of strips, each adapted to transmit one only of the plurality of component colors of the image. To this end the arrangement for filtering the light image consists of a transparency having areas or sections arranged in a repeating cycle such that each separate area transmits one only of the selected series of component colors, after which the cycle repeats. An optical or color filter of this nature is positioned in the path of the light from the image to the light-responsive target of the camera tube. Usually the filter will lie in the plane of a primary image and a secondary image of the filter as illuminated by the primary image will be projected on the tube target, but if the construction of the tube is such that the filter can be closely adjacent the target the second projection may be unnecessary. The light of the image is thus cast upon the camera tube target in adjacent areas to represent subordinate areas of that image in the different component colors. In filters of the preferred strip type, the strip widths along the direction of scanning are of the order of magnitude of that of one image element width in scanning analysis and, as will be later shown, especial advantages accrue from a width substantially 2⅔ that of the scanning or image element. The exact width is a function of frequencies used to produce the pattern in which the color areas are disposed on the picture field and will be discussed in more detail hereinafter. The light image in the different colors as formed in the several strips is so cast that the individual light color strips extend in directions transverse to that along which the image is analyzed. Accordingly, in the image analysis there is substantially a division of the lines of the image into a series of segments representing in sequence each selected component color.

This form of analysis then may continue throughout a complete scanning of the image from top to bottom in such a way that the image points or elements scanned change in each line in sequence through each color of the cycle. Illustratively, a scanning line may be composed of a repeating sequence of color segments representing the colors red, blue, green, red, blue, green, and so on, each segment being at least one and preferably several picture or image elements in length.

If the image analysis were carried on in such manner it is apparent that the color detail obtainable from scanning would be only one-third that in which the image could be analyzed for black-and-white operations (assuming tricolor operation). To avoid the resultant losses in detail, provision is made in the apparatus herein to be described for moving the color filter continually during image analysis.

It should be mentioned here, however, that while we prefer the type of operation above referred to as avoiding many receiver difficulties, the invention is also applicable to operations wherein complete color interlace is not achieved, as in the "dot multiplex" which has been advocated recently. When used with this later system the filter areas must be not more than one color dot in width, and one color dot in this case is only about two-thirds the size of the minimum picture element that can actually be transmitted by the system as a whole. In such case the size of the element is defined by the diameter of the scanning spot in the camera tube. To receive such a transmission "sampling" or some equivalent process at the receiver and the transmitter is necessary; in its absence the received picture appears in black-and-white. In what follows the illustrations are based on a system which does not require sampling as we believe the latter type of operation preferable and the conversion factors necessary to apply the invention to other systems can readily be deduced by those skilled in the art.

The color filter preferably comprises a series of sections, each of image height, imposed by color photography or similar means upon a transparent pellicle such as a motion picture film. Each section of the filter thus produced is identical with the others except for a lateral displacement as between successive sections, in order that each element of the picture in turn may be represented in each component color. This film is moved at a continuous rate in substantially the image plane at a rate such that the junction between adjacent sections follows closely behind the scanning beam in its progress across the image field. As a result, immediately after the charge image produced in the camera tube has been scanned, a new charge begins to accumulate representative, in each sub-area of the picture field, of the illumination of that field with respect to the various color components as defined by the newly advancing section of the filter. With this arrangement each area of the charge image has a period equal to the field of scanning rate ($^1/_{60}$ second in accordance with present day standards) to stabilize the charge image in accordance with the values of illumination as determined by the color components of the image and the action of the various strips of the filter.

In the alternative, and for types of camera tubes having lower storage capacity and shorter time constants or with tubes of non-storage types, the filter may be moved transversely across the image at a much lower rate, i. e., at a rate corresponding to the width of one color area of the filter per field. Under such circumstances the necessary progression can either be imparted to a continuous strip of filter or the filter may be mounted in a light frame and reciprocated in the image plane by a motor generally similar to a moving coil loud-speaker movement. Although this latter type of arrangement has the advantage of lightness and simplicity of construction it is not as universally applicable as is the continuously moving form and only certain definite patterns of color distribution are possible with it.

The actual pattern produced is a function of the frequencies which, as will be shown, are generated to provide color synchronism and phasing both in the camera and at the receiver. Theoretically the color segments along each scanning line can be of any length and accordingly nearly any frequency higher than the line scanning frequency could be used to effect color synchronism and phase. Practical considerations, however, demand that the frequency used bear integral harmonic or sub-harmonic relations to the line frequency and this limits the dimensions of the filter strips to certain definite types of patterns.

If the color segments of the line are short it can be shown that if all detail within the resolving power of the allotted frequency band is to be transmitted in all colors, without introducing spurious "structure," it is necessary that the system as a whole be capable of transmitting at least the fourth harmonic of the repetition frequency of any single color component, and that this harmonic be quite close to the limit of the band. Best color distribution is achieved if the color segments of the scanning lines are as short as possible. Since four megacycles is the highest frequency now allotted to television transmission, the fourth harmonic above mentioned cannot be higher than four megacycles; therefore the color repetition frequency most desirable is one megacycle or quite close thereto, but can be varied by as much as few kilocycles on either side of the one megacycle value without materially affecting the performance of the system. For convenience, therefore, the color repetition frequencies which we prefer to use to produce the various possible patterns will be referred to as being "one megacycle" with the understanding that this is approximate and that where precise values are necessary in order to make clear some particular point they will be specified.

Certain particular types of image orthicon tubes suitable for use with this invention are provided with a photosensitive surface which is 1.6 inches in effective diameter, upon which an image field which is 1.2 inches wide and .9 inch high may be projected. Under present standards a frequency of 15,750 is used for horizontal scanning, giving a line period of almost exactly 63.5 microseconds per line. Of this 63.5 microseconds 14% is utilized for blanking, and with the size of field above given the scanning beam sweeps out the 1.2 inch line in 54.6 microseconds, very nearly. The width of each cycle of three color filter strips is therefore $$\frac{1.2}{54.6}=0.022 \text{ in.}$$

for the three color strips of the filter cycle, or .00731 for the width of each strip of the cycle.

It is well known that the smallest elementary area along a scanning line which can be reproduced by a television system is that which is traversed in one-half cycle of the highest frequency which the system will transmit. With the allotted band of four megacycles this is one-eighth microsecond. One picture element of the image field is therefore in this case 0.022/8=0.00274 inch wide. The width of each filter strip, as found above, is 2⅔ times this, leading to the preferred value of the width as given above.

The width of the minimum image element is also the maximum diameter which the scanning beam may have to produce a resolution required. In actual practice the effective diameter of the scanning beams used is considerably smaller than this.

The effective minimum width of filter strips from which pure colors may be obtained, even by employing sampling methods, is that of producing an image of the effective diameter of the scanning spot of the camera tube.

As above indicated, successive sections of filter of the character above described are imposed on a length of motion picture film, each successive section being substantially identical except for the fact that the various color strips are transposed laterally by an amount bearing a definite proportion to the width of each color strip of the filter. As has been indicated above various transpositions are possible. In the simplest and least desirable the transposition is uniform from field to field and in the amount of either one-half or one strip width. To produce the pattern which we now prefer, however, the transpositions are alternately in the amount of one and one-half times the width of one strip and one-half the strip width, repeated in successive fields through a cycle of six fields, which brings the original arrangement back at the seventh field. This transposition cycle can then be repeated indefinitely in a continuous length, or, preferably, some integral number of transposition cycles can be formed into a loop which is continuously circulated.

In a preferred form of the invention the light of the image is directed through a suitable main objective lens and the multiple strip optical or color filter and usually a second objective lens, upon the light-sensitive target area of the camera tube. In conjunction with this image, which represents the subject, there is superimposed under the control of the tracking section a second image of a tracking grid, most conveniently also a filter. The tracking optical or color section comprises a plurality of areas of widths generally corresponding to integral multiples of the widths of the multiple color filter areas but with the colors differently arranged. The tracking filter, however, is preferably formed with areas having colors corresponding to all of the selected component colors used in the system for analyzing the image and, in addition, black, white, and the complementary colors of the selected component colors, such filters frequently being designated as minus red, minus blue and minus green. A light image of the color area formation corresponding to the tracking section is then projected to be superimposed upon the light image of the subject. By forming the filters in such a way that the multiple area optical or color filter and tracking grid sections are appropriately spaced relative to one another, and through appropriate optical means, precise superpositioning of the different color area images upon the camera tube may be made, so that light representing the different areas may be controlled in accordance with any desired pattern. It is to be noted that while the tracking grid is most conveniently a filter, and hence is frequently herein referred to as such, it could also be formed of colored bands on an opaque base, its image, in this case, being projected on the image filter by reflection. In any case the illumination of the tracking section should be by white light containing radiation of all of the color components used.

In a preferred form of the invention the light of the image is directed through a suitable main objective lens and the multiple strip optical or color filter and usually a second objective lens, upon the light-sensitive target area of the camera tube. In conjunction with this image, which represents the subject, there is superimposed under the control of the tracking section a second image of a tracking grid, most conveniently also a filter. The tracking optical or color section comprises a plurality of areas of widths generally corresponding to integral multiples of the widths of the multiple color filter areas but with the colors differently arranged. The tracking filter, however, is preferably formed with areas having colors corresponding to all of the selected component colors used in the system for analyzing the image and, in addition, black, white, and the complementary colors of the selected component colors, such filters frequently being designated as minus red, minus blue and minus green. A light image of the color area formation corresponding to the tracking section is then projected to be superimposed upon the light image of the subject. By forming the filters in such a way that the multiple area optical or color filter and tracking grid sections are appropriately spaced relative to one another, and through appropriate optical means, precise superpositioning of the different color area images upon the camera tube may be made, so that light representing the different areas may be controlled in accordance with any desired pattern. It is to be noted that while the tracking grid is most conveniently a filter, and hence is frequently herein referred to as such, it could also be formed of colored bands on an opaque base, its image, in this case, being projected on the image filter by reflection. In any case the illumination of the tracking section should be by white light containing radiation of all of the color components used.

The two light images thus produced are superimposed upon one another as the camera tube is illuminated. The image due to the subject is of a brilliance and color which, naturally, corresponds to the color components of the subject of which the image is to be produced. The image due to the tracking filter section is of a brilliance which is regulatory but of constant intensity during operation. The brilliance of the tracking image is set preferably at a level which is approximately 20% of that of the highlights of the incoming optical image. The tracking grid section, under these circumstances, may provide both synchronizing and color phasing information, provided it is superimposed upon the video signal to establish what will here be termed a "compound video signal." Certain specifications are required to achieve this objective. The tracking information should have a period, for a tricolor system, of one color segment, or some multiple thereof, if information regarding synchronous operation is to be obtained. Next, the tracking information should be such that the chance that it will be duplicated by picture content is extremely remote. Lastly, the tracking information should have an easily identifiable characteristic with respect to some particular color of analysis if the information is to be usable for color phasing. Information concerning synchronizing and phasing operations implies the need for an ultimate signal having a sinusoidal waveform of a periodicity corresponding to three color segments per cycle. The requirement that this information shall be incapable of being duplicated by picture content implies that the superimposed optical image which is to be combined with the picture produced video signal output to form the "compound video signal" should be of other than simple periodic nature in order that accidental duplication resulting from picture content shall not occur. The two conditions are generally, of themselves, apparently inconsistent. To achieve the result desired the tracking filter section herein proposed is formed as a cipher or code which, when combined with the color information, establishes the desired operational conditions.

The fact that such a tracking signal is artificially introduced into the image implies that this signal must either be invisible when projected onto the screen at the receiver or it must, in some manner, be removed from the signal before transmission. The former method is possible, particularly where the system need not produce signals which may be received on black-and-white receivers but for general use removal of the coded tracking signal is better.

To accomplish this the compound signal is "decoded" in such manner as to establish a substantially constant frequency which is filtered out and used to regulate camera tracking, the frequency so produced being discriminated against a control signal. Any error signal, produced by the discriminator as a result of variations in the tracking rate, is injected into the camera deflecting circuits in such direction as to correct the discrepancy to within a negligible degree of error.

Since the tracking pattern is definite and constant it can be resynthesized from the waveforms developed as will be described herein and injected into the signal delivered by the camera output in reverse phase, thereby eliminating it from the signal transmitted.

From the foregoing it becomes one of the objects of the invention to develop video signals according to a segmental pattern sequentially repeating, where the sequentially-developed segments represent the several component colors of a polychrome scanning operation, and wherein provision is made automatically for synchronizing and phasing the scanning operation.

A further object to be achieved by this invention is that of providing camera apparatus for analyzing images and converting them into video signals representative of the scanned image in substantially true color. At the same time, the invention seeks to provide analyzing apparatus wherein there is a complete freedom from color distortion in the image which is finally recreated from the developed signals coming about as a result of camera image misregistration.

Still a further object of the invention is to provide camera apparatus for analyzing an optical image according substantially to its natural color and to confining the analyzing process to a single image area only, whereby the scanned pattern for each separate analysis may be maintained precisely the same in order that there may be no variance in scanning pattern which could introduce distortion which would impair the quality of the finally re-created picture.

Another object of the invention is that of providing camera apparatus for analyzing an optical image to produce signals representing that image in substantially its natural color, wherein the rate of analysis into the different colors may be automatically controlled by a signal developed concomitantly with the image analysis, and which comes into being under the control of the scanning operation.

Another object of the invention is that of providing camera apparatus for polychrome image analysis in which the camera comprises but a single tube to convert the optical image into video signals and wherein only a single image field is projected upon the light-sensitive target area of that tube for scanning purposes.

Other objects of the invention are those of providing a simplified analyzing system which is highly efficient in its use, stable in its operation, and which adapts itself to various forms of image analysis and scanning patterns.

Other objects will suggest themselves after reading of the following description and claims in connection with the accompanying drawings, in which:

Fig. 1 is a schematic representation of camera apparatus developed in accordance with the present invention and employing the continuously moving type of filter, the showing being in horizontal section;

Fig. 1*a* is a fragmentary detail, indicating the reciprocating type of filter drive which may, in certain instances, be substituted for the continuous drive of Fig. 1;

Figure 1:
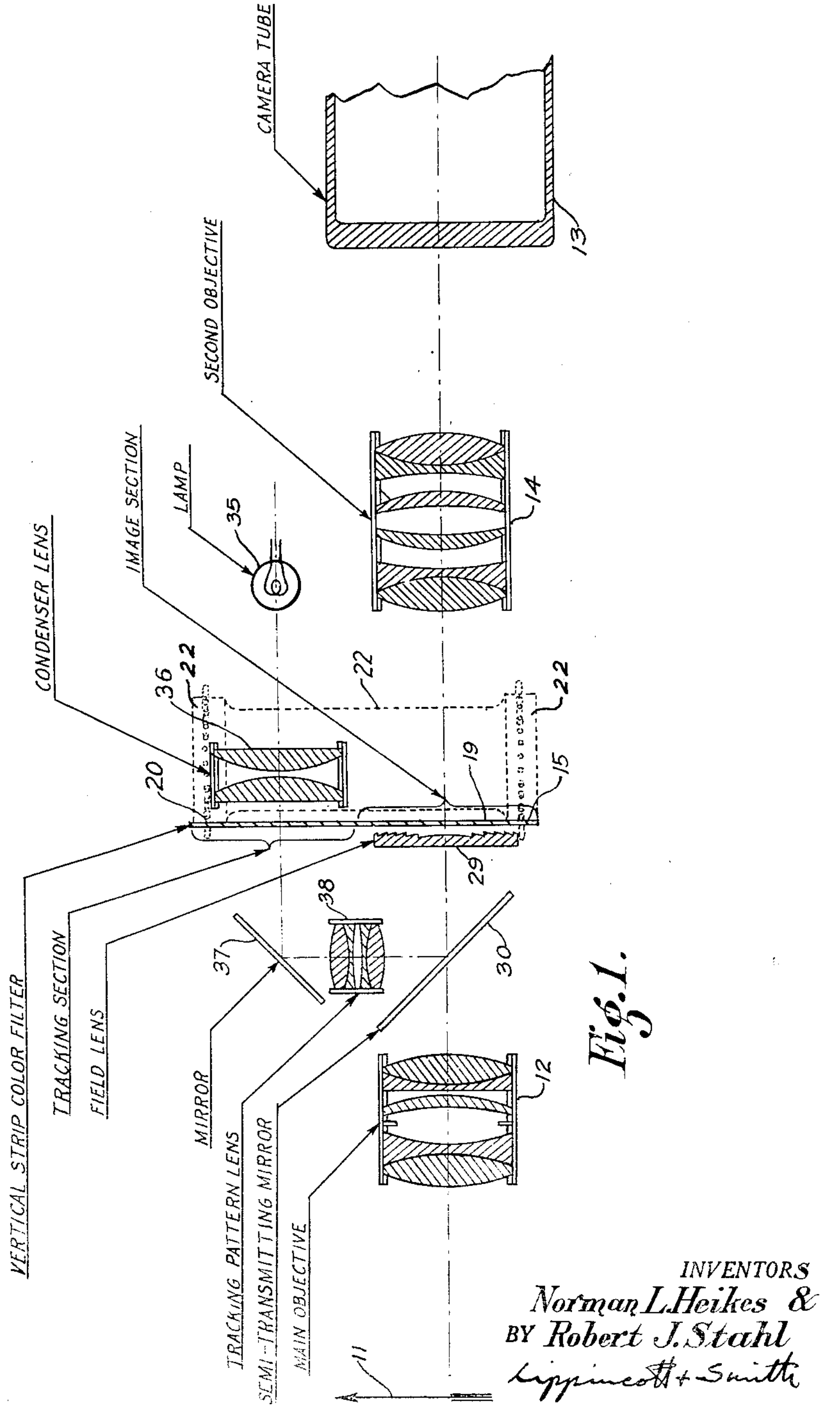

Making reference now to Fig. 1 of the drawings, an optical image of a subject conventionally represented at 11 is directed through a main objective lens system conventionally represented at 12 to fall upon the light-sensitive surface (not shown) of a camera tube, conventionally represented at 13. The camera tube may be one of the type and style known as the image orthicon tube, wherein the optical image creates suitable charges which are scanned by a cathode ray beam deflected in a bi-directional pattern to trace a target area along suitable sawtooth patterns. Video signal outputs are developed as a result of this scanning operation, as is well known and as will be mentioned further in discussing Fig. 6.

Figure 6:
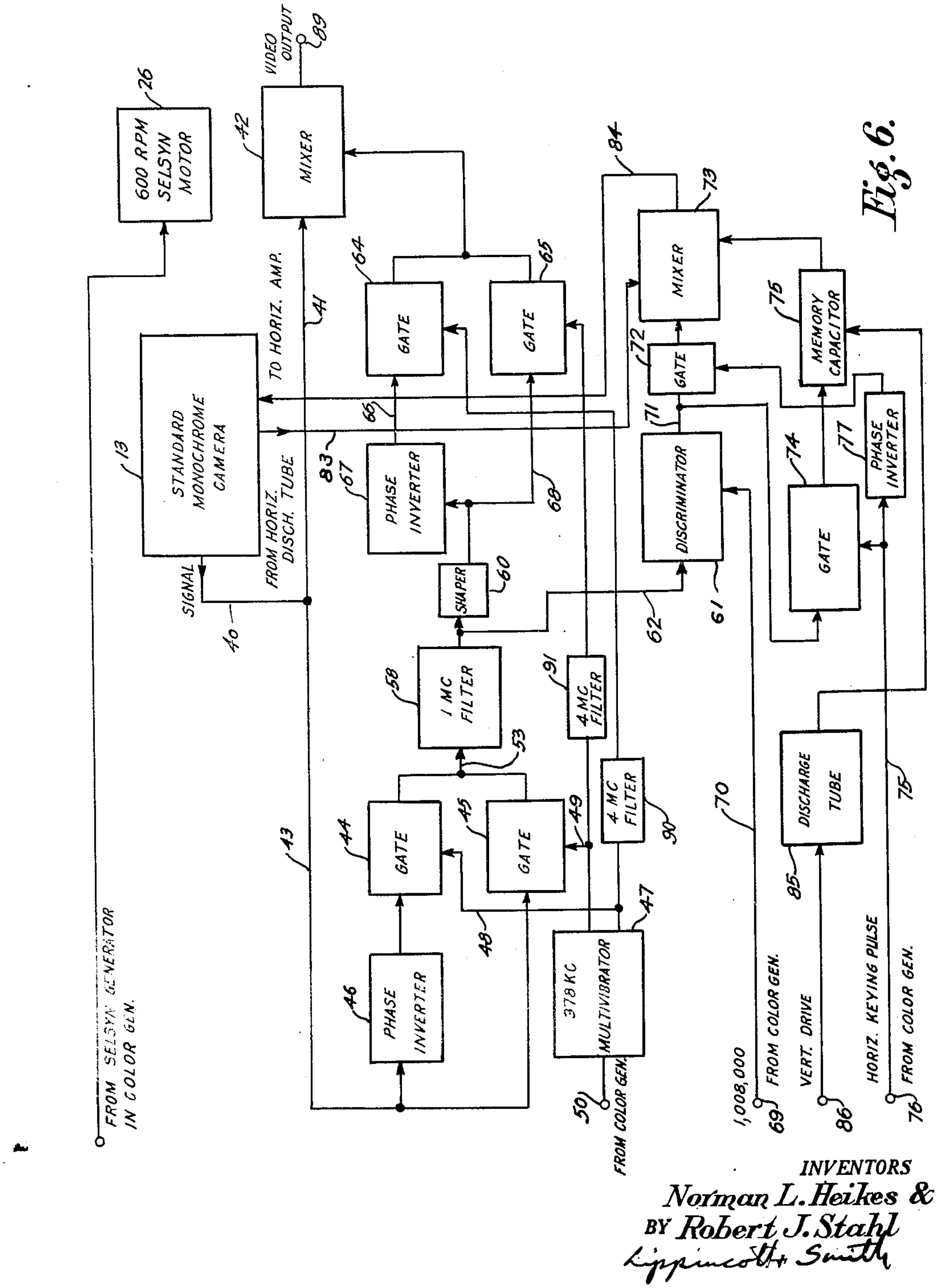
Fig. 6 is a block diagram of the circuitry associated with a color television camera to control its scanning in accordance with the present invention.

The scanning operation per se forms no part of the present invention except as it is controlled in the manner schematically represented, illustratively, by the circuitry exemplified, for instance, by Fig. 6 and later to be described. For the purpose of the understanding of the operation at the moment, it may be assumed that the light image from the main objective lens system 12 is directed through a second objective lens system 14 and other components later to be mentioned, to cast a color image, also later to be explained, of bi-dimensional character on the light-sensitive surface of the image orthicon or other camera tube 13. The image so directed may be masked as desired, so that the ratio of its width to its height provides the normally-accepted aspect ratio of 4:3. The line analysis is carried forward along paths substantially parallel to the long dimension of the image, with the field analysis occurring substantially at right angles thereto. The number of image lines into which the scanning pattern is divided is made to coincide with presently-accepted standards for black and white, so that in any two successive field scannings the image will be analyzed along 262½ lines in each field, with the lines interlaced in the standard 2:1 relationship, neglecting, of course, for illustrative purposes, conditions of blanking at the end of each scanned field, which reduces the number of lines scanned in accordance with the time duration of the blanking signal. To obtain the desired color analysis, the optical image of the subject 11 as it is focused upon the camera tube 13 by means of the main objective lens system 12 and the second objective lens system 14 is directed through a multiple-strip optical or color filter 15 of the character generally represented by the showing in Fig. 3, to which momentary reference may now be made.

The multiple-strip color filter 15 is formed of sections, each comprising a plurality of parallel strips 16, 17 and 18, repeating to provide a number of strips equal to the number of color segments in which each line of the image is analyzed, each segment being of a length to include one or more picture detail elements. Illustratively, the strips 16, 17 and 18 may comprise areas transparent to selected component or primary colors of green, red and blue for a tri-primary polychrome operation. The filter strip elements are of a length which will extend completely across the short dimension of the image cast upon the light-sensitive surface of the camera tube. Each filter strip is preferably of the same width, related to the size of the smallest elementary area that can be translated by the system, preferably as above specified so that the filter areas as projected upon the camera tube target area by the second objective lens system 14 shall divide that area into strips of color images corresponding to the colors of the filter strip sections themselves.

In the preferred embodiment of the invention both the image section 19 and the tracking grid 20 are photographed side by side on the film 15, formed, as has already been indicated, as a continuous loop formed of an integral number of transposition cycles each of which includes six frames. As it is advantageous from the standpoint of light utilization to use a magnification ratio of 1 to 1 as between the image formed in the plane of the filter 15 by the main objective lens 12 and the secondary image formed on the photosensitive target of the tube 13 by the secondary objective 14, each field of the filter is preferably nine-tenths of an inch in dimension along the length of the film. Other rates of progression and magnification ratios are possible. The filter strip 15 is progressed continuously on a constant speed in an upward direction by sprockets 22 driven, in the usual manner, by a synchronous, or preferably, a selsyn motor 26, not shown in Figs. 1 and 2 but indicated in the block diagram of Fig. 6. The speed of the motor is dependent upon the length of the filter fields on the film and the diameter chosen for the sprockets 22. In the present instance it is assumed that the motor turns over at 600 R. P. M., and that it progresses the filter strip at a rate of 54 inches per second. Although this speed is apparently high it results in very little wear upon the filter strip since the speed is constant and the film is subject to no rapid acceleration except in starting and stopping. Minor accelerations may be permitted, such as those due to hunting of the motor since the variations in the film position due to such hunting are of very small amplitude and have no effect whatsoever upon the picture. Lateral "weave" of the film should be reduced to the minimum, however, by expedients well known in the motion picture art. As should be apparent from what will be later described, lateral weave within the limits to be expected when due precautions are taken will be completely compensated by the electronic tracking arrangements and will result in no loss of synchronism or color in the reproduced pictures. Weave is therefore no more important than it is in motion pictures, where it is not ordinarily perceptible by observers.

In the camera arrangement herein to be described a field lens 29 is positioned immediately adjacent the multiple-strip color filter 15. This lens is, preferably, a Fresnel type and directs the light from the main objective lens system 12 into the second objective lens system 14. The Fresnel lens need not be of an especially high quality, since it does not contribute to the image formation, but the type chosen should preferably be selected as against a standard converging lens in order to avoid the introduction of serious Petzval curvature effects. The steps should, however, be sufficiently shallow to provide negligible shadowing in the image.

Between the main objective lens system 12 and the Fresnel type field lens 29 a partially-transparent mirror 30 is supported. The light of the optical image is passed through this partially-transparent mirror. The mirror is supported at an angle of 45° with respect to the optical axis of the main objective lens system 12. The transparency of the mirror 30 may be of any range between one-half and that maximum value at which it will reflect the minimum necessary light directed thereupon from a path originating on the surface side toward the multiple-strip color filter. For illustrative purposes only, in this description it may be assumed that the partially-transparent mirror 30 is only semi-transparent in nature, although this usually would not be the case, the actual transparency being greater. Under certain circumstances the reflection from a plane sheet of glass may be sufficient.

As has already been explained the tracking section 20 for each field is imposed, side by side with the image section, upon the double width film 15. It should be obvious that it could also be formed on a separate film strip and driven by sprockets on the same drive shafts as those which progress the image section of the filter or even driven by a separate motor provided that selsyn drive were used for both image and tracking sections. These expedients are possible because of the latitude in registration of the tracking grid image and image filter which will be described fully hereinafter. Generally, however, we prefer to use a single film as the carrier for both image and tracking sections, in view of the saving of weight and parts which this implies.

The image of the tracking grid is in this instance superimposed upon the image filter by means of an auxiliary optical system which derives its illumination from a lamp 35, the brilliancy whereof is maintained at a substantially constant value. This lamp should preferably be of the "daylight" type having a sensibly uniform radiation output in all three of the primary colors used in the system and passed by the filter strips of the image portion 19. This is not an essential, however, since other types of lamps can be used and the radiation therefrom corrected by light-density filters of the so-called "cc" type.

The illumination from the lamp 35 is directed by a condenser lens assembly 36 through the tracking section 20 of the filter. After passing through the filter the light is redirected by a first surface mirror 37 or, equivalent device (such as a total reflecting prism) and thence to a tracking pattern lens 38 which is so positioned as to focus an image of the tracking section in the plane of the filter section 19, the light which forms the image being redirected for this purpose by the partially transparent mirror 30. The field lens 29 acts on the tracking section image in precisely the same way as on the image of the subject 11, redirecting this light into the second objective 14. A large amount of the light from the lamp 35 is, of course, lost by transmission through the semi-transparent mirror. This is unimportant, however, since the maximum illumination of the tracking grid image is not designed to exceed 20% of the high-light value of the subject image and plenty of light is available from the lamp 35.

The purpose of the tracking section of the filter is to impose upon the image section a coding signal of constant amplitude and definite waveform, of a character which would be practically impossible to duplicate by any picture content, and whose waveform can accurately be resynthesized so that a substantially identical signal can be reinjected into the camera output in opposite phase and thus cancel the coding pattern from the transmitted signal. Furthermore, the coding signal produced is of such character that it can be used to correct the rate of sweep of the camera scanning beam so that it will traverse the filter areas of the various colors at precisely predetermined instants, and allot to each color its predetermined and equal interval. The tracking section 20 of the filter 15 accomplishes this, and, furthermore, does it in such manner that only approximate registration is needed as between the image of the tracking grid and the image filter itself in order to do so.

This is accomplished by the use, in the tracking grid, of the secondary colors cyan, containing light of blue and green (minus red), purple, having red and blue components to the exclusion of green (minus green), and yellow with the components of red and green only (minus blue). In addition white is used, containing all colors, and black, containing none. In the various diagrams illustrating filter and tracking arrangements these colors are indicated by their initial letters with the exception of black, which in this connection is indicated by "X."

In producing the coded tracking signal use is made of the fact that where the image of a tracking grid area of a primary color falls upon an image filter strip of the same color the illumination of the filter grid image will pass but it will be stopped, and thus cast a shadow, if it falls upon an image filter strip of either of the other two primary colors. On the other hand, if the tracking grid image is of a secondary color it will pass if it falls upon an image filter strip of either of its two primary components but will be stopped by a strip of its "minus" color.

A fairly large number of codes using this basic principle are possible. The one here considered in detail employs the color sequence illustrated at the top of Fig. 4, where the sequence of color strips in the tracking grid is given as cyan, green, black, red, red, yellow, green, cyan, cyan, white, yellow, red, red, purple, white, cyan, cyan, blue, purple, red, red, black, blue, cyan, after which the sequence repeats. The image of the tracking grid, with the strips in this order, is focused upon the image filter with the first cyan strip image superimposed upon a green strip of the image section. The image filter strips then continue in the order of red, blue, green over the entire width of the filter.

Figure 3:
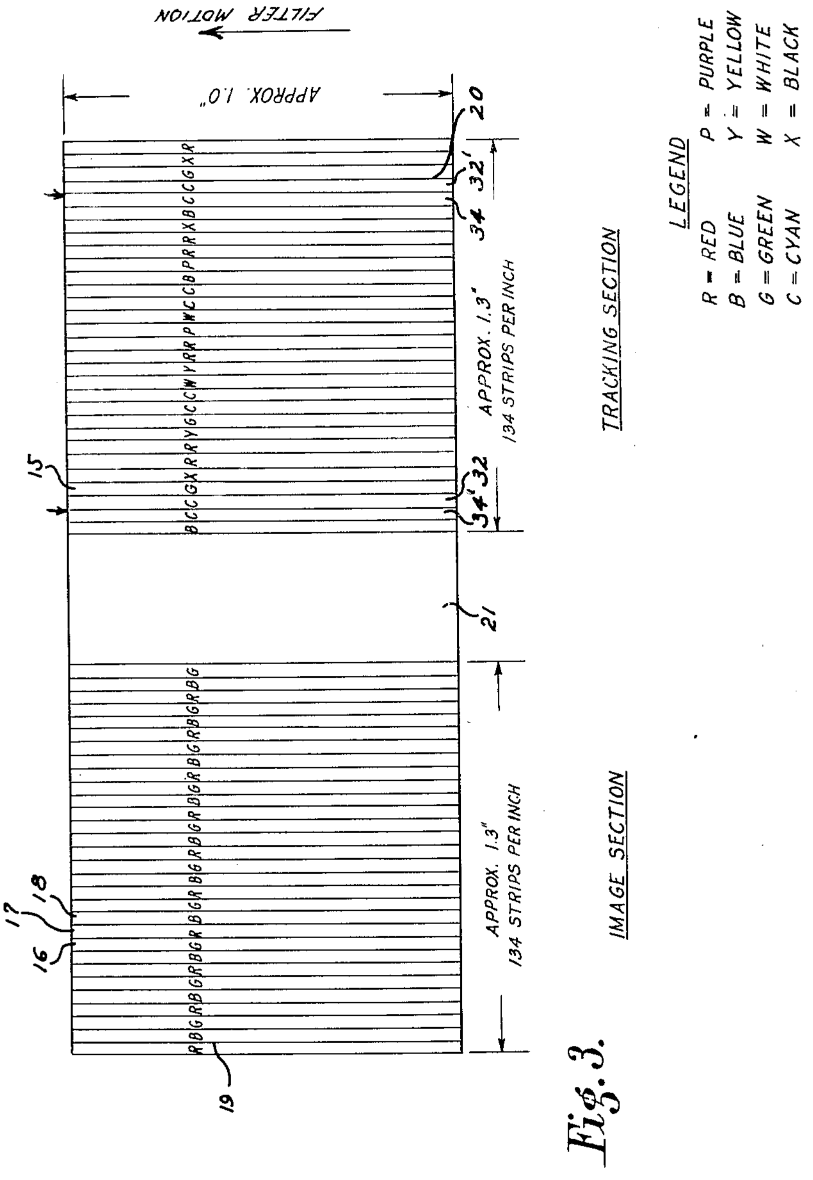
Fig. 3 represents schematically a color filter in accordance with the present invention, both image and tracking sections for one selected scanning pattern being shown.
Figure 4:
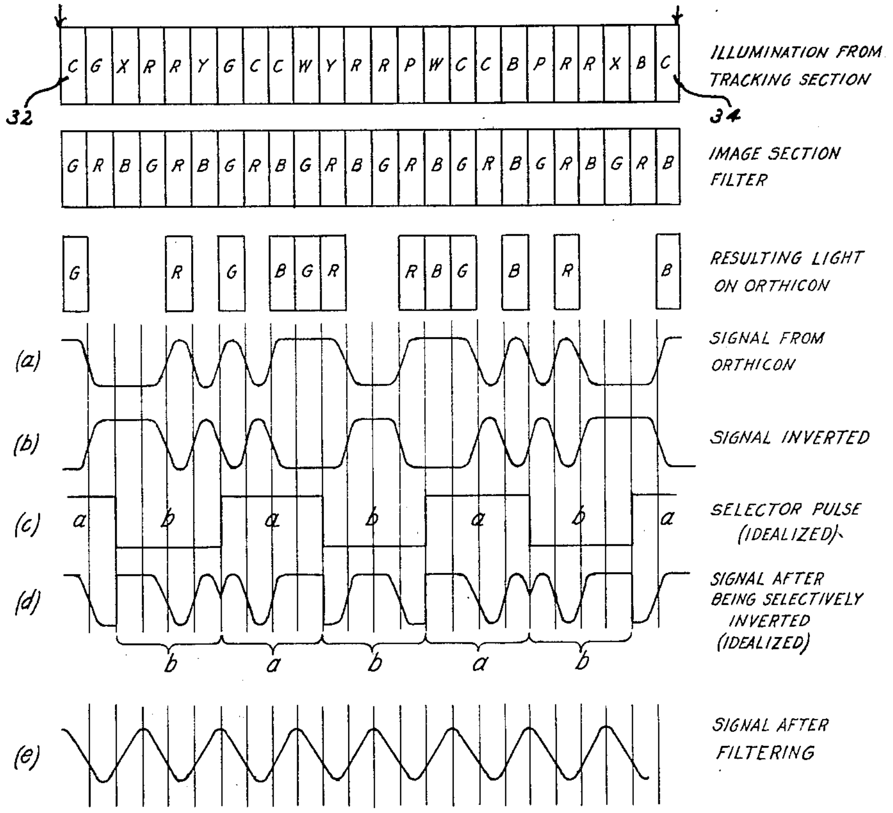
Fig. 4 is a series of graphs of waveforms developed in the apparatus in developing one type of tracking waveforms, these graphs being shown in relation to the specific type of tracking grid illustrated in Fig. 3.
Figure 7:
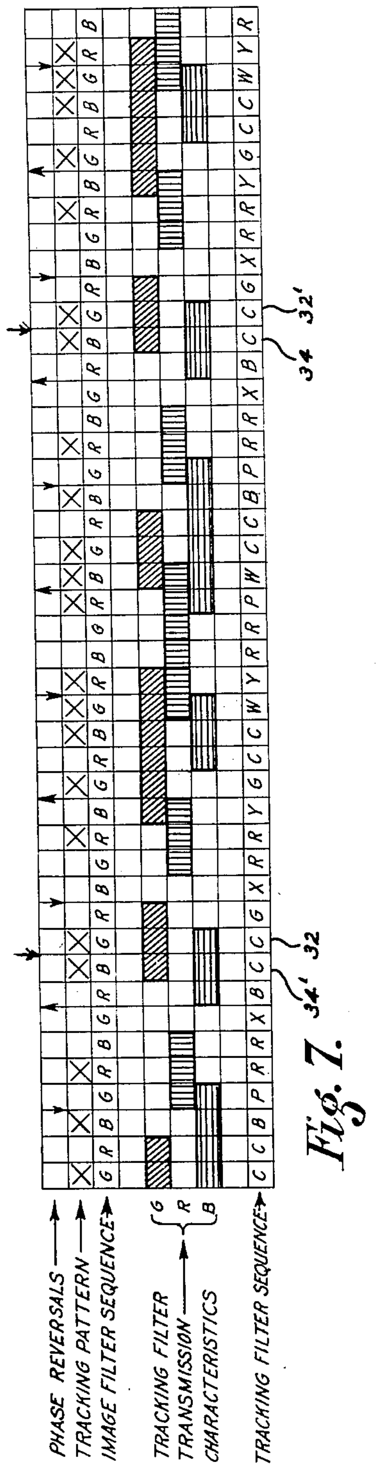
Figs. 7 and 8 are diagrams indicating the colors passed by the various areas of the tracking filter, considered in relation to the colors of the associated image filter, the diagram of Fig. 7 corresponding with that also illustrated in Figs. 3 and 4.

The foregoing may be better understood by reference to and a comparison of Figs. 3, 4, and 7, all of which are illustrative of various characteristics of the tracking grid as combined with the image filter. In Fig. 3 there is shown the relationship between the position of the image section and the tracking sections of the filters as they appear on the filter strip relating to one frame of the scanning cycle, it being understood that the width of each strip is greatly exaggerated, one cycle of the tracking sequence being shown as filling substantially the entire area whereas, in fact, nearly seven cycles of the dimensions noted would be required. The upper row of blocks in the columns of Fig. 4 is lettered to indicate the colors of the successive strips of one cycle of the tracking filter, the blocks in the second line are similarly lettered to indicate the colors of the image filter, while the third line shows only the blocks representing the colors actually passed by the combination of both filters. Below these blocks are shown the various waveforms used in the decoding process or resulting therefrom. In each case the small arrows at the top of the figures indicate the beginning and the end, respectively, of a single cycle.

In Fig. 3 the reference character 32 indicates a cyan strip of the tracking grid with which the cycle is assumed to start while the reference character 34 is applied to the strip, also cyan, which concludes the cycle. The reference character 32' is applied to the strip representing the start of a cycle succeeding that shown in its entirety while the character 34' indicates the conclusion of a preceding one.

In Fig. 7 the combinations which will pass light are indicated in the line identified as "Tracking Pattern" by a cross. In the latter figure the sequence of strips in the image filter is given in the order green, red, blue, green et cetera in the third row of the diagram, while the tracking filter sequence is shown in the bottom line. The blocks in the various columns in the intermediate lines indicate which of the primary colors are contained in light of the color indicated in the same column of the tracking section. Thus cyan passes both green and blue, and the first strip of the cycle, being of cyan and registered with the green strip on the image filter passes light of that color as is indicated by the cross in the top row. The succeeding green strip of the tracking section passes only green and the illumination therefrom is therefore stopped by the red primary strip with which it registers. The succeeding blue and green strips of the image filter receive, respectively, no illumination from the black strip of the tracking section and red light only, and hence pass no light at all, while the succeeding red image filter strip receives red from the tracking strip and again passes illumination, as indicated by the cross in the upper line. The pattern can similarly be followed out through the entire sequence.

In Fig. 4 this is shown in a different manner as has already been explained. Here only the colors actually received on the sensitive surface of the camera tube are indicated in the third line from the top of the figure. It will be seen that the light that is passed represents all three colors of the image filter color cycle but that they are arranged in groups which give bands of light and shade of differing widths. It is to be remembered that the sensitive surface of the camera tube of itself will make no distinction as to color but will generate a signal which may be termed "positive" where there is light and "negative" where there is shade. In addition to the fact that the pattern produced by the tracking filter contains light of each of the three primary colors it is to be noted that, with respect to any one color of the image filter sequence, this light is sometimes passed and sometimes stopped. It is these characteristics that make this pattern almost impossible of reproduction by any normal picture content.

While the tracking grid sequence is supposed to be registered upon the image filter as described above its sequence is so chosen that a misregistry of one tracking grid strip or less, in either direction, will not change the color pattern produced upon the camera tube surface or the resulting output signal as shown in curve $a$ of Fig. 4. It can be seen by examining the image filter colors as shown in the figure in comparison with the filter grid colors matched with the adjoining strips on either the right or left that the image filter will still pass or stop (as the case may be) the light passed by the tracking grid strip. A further misalinement of one or more strips (i. e., two to four lines displacement from the norm in either direction) will result in the same waveform as before but in a phase displacement of that waveform of 90 degrees. A displacement in the range between five and seven lines in either direction will cause a 180 degree change in the waveform $a$ of Fig. 4.

It may be noted that this general type of tracking filter may be constructed to conform to any type of coding that may be desired for the tracking signal and that with a three-primary system a latitude of one line misregistration on either side of the norm may always be provided. The type of code used involves only two types of signals, "pass" and "stop," which are equivalent to the telegraphic "mark" and "space." The strips of the picture image filter pass the light of one primary and stop the other two. The same is true of the primary color strips of the tracking grid. The complementary or secondary color strips of the tracking grid, however, pass two primaries and stop one. Considering any specific color strip as the norm, and assuming that it is desired that it pass a positive signal, the strip lying next to it on either side may be required either to pass or stop the infalling light. If the adjacent strip is also to pass light the tracking strips normally registered with both are made of the secondary color which will pass both primaries. If the adjacent strip is to stop the light from reaching the camera surface the corresponding tracking grid strip is either of the same color as the norm or of the "minus" color of the adjacent strip, the single primary strip being used if the adjacent strips on both sides are to generate a "stop" or negative signal and of the minus type if there is to be a stop signal generated on one side and a pass signal on the other side in the norm. Finally, a white strip will pass the normal color and those on both sides and a black strip will stop all three. With the code waveform to be generated determined, the proper tracking grid colors can be easily derived.

Figure 8:
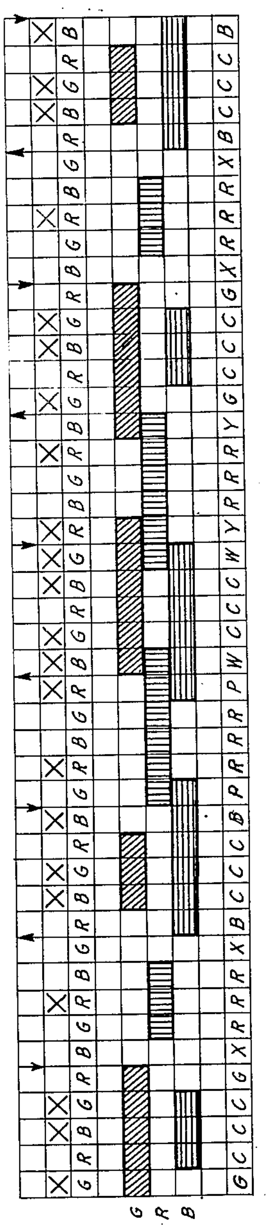

Many codes are possible within the scope of this invention. In the one here chosen for detail discussion the longest signal of either the pass or stop variety is equivalent to the width of three successive strips of the image filter, but codes using pass or stop intervals equivalent to two, four or more filter strips can be devised. Fig. 8 shows, in the same manner as Fig. 7, another pattern employing pass and stop bands each of three different widths. Its operation can easily be deduced from what has been given above, and the somewhat lengthy detailed explanation should not be necessary. It is, of course, also possible to use a tracking grid comprised of simple black-and-white bars, but this has the very great disadvantage of requiring practically perfect registration if highly undesirable effects are not to be produced.

The waveform generated by the specific type of coding illustrated in Figs. 3 and 4 is illustrated by the waveform $a$ of Fig. 4. This signal will be seen to comprise signal pulses rising and falling, depending upon whether or not light is present. By reference to Fig. 4 it will be seen that the waveform produced by scanning this pattern comprises successive positive and negative waves, with longer waves of each polarity interspersed at intervals between the shorter ones. Disregarding for a moment the actual colors of the light from the tracking section passed by the image filter it will be seen that the pattern formed on the camera tube constitutes alternate bands of light and shade in a recurring cycle having a different fundamental period from the image filter cycle, and that the light and shade patterns are arranged in alternate groups of similar form but with the light and shade areas in alternate groups reversed with respect to the remaining groups. This can be seen in waveform $a$ of Fig. 4, where the pattern due to the second twelve strips of the tracking filter is seen to be that of the first twelve in reverse phase, while considering the filter strips in groups of six, the second group, starting at the beginning of the tracking cycle, is seen to be similar to the first six but reversed in order as well as phase, the same holding true for each successive group of six.

The waveforms illustrated in Fig. 4, showing one cycle of the tracking pattern starting and ending with the cyan strips 32 and 34 respectively, comprise four such mutually inverted groups.

Considering now the operation of the system as a whole and the control of the scanning operation, signal output from the camera tube 13 represented by both the signal due to the image itself (not shown by Fig. 4), and the superimposed constant amplitude signal due to the illumination from the tracking section, will be supplied by the output connection 40 so as to feed in one direction by the connection 41 to a suitable mixer 42, later to be described. In a second direction the output signal from the camera tube 13 representing both the light image of the subject and the superimposed tracking filter illumination is supplied along the conductor 43 to the gates 44 and 45, with the signal being supplied to the gate 44 in opposite polarity to that supplied to gate 45 by reason of its being passed through a phase inverter 46. The phase inverter 46 is preferably an amplifier tube providing unity amplification and merely serves to reverse the polarity of the signal supplied from the camera tube to gate 44 as compared to that supplied to the gate 45 directly.

The gates 44 and 45 may illustratively be in the form of tetrodes with the camera tube signals and tracking filter signals being supplied to the inner grid thereof. The outer or screen grid then may be keyed to control the signal output from either gate. Keying of the output signal from the gates 44 and 45 is provided by way of a key circuit 47 which, in one form, may comprise a multivibrator of known characteristics. The signals may be applied, however, between any two electrodes as desired and instead of keying from the screen the tube may be keyed from the cathode or anode or inner grid and the input signal then applied to use by the other elements as is well known in the art.

Illustratively, and for the conditions hereinabove assumed, the multivibrator frequency will be at 378,000 cycles per second which is three-eighths the color repetition frequency. The outputs from this multivibrator are derived in opposite polarity on conductors 48 and 49, connected respectively to the outer or screen grids of the gate tubes 44 and 45 in one form of connection. Consequently, during alternate half cycles the gate 44 is open and the gate 45 is closed. On the succeeding half cycle of multivibrator 47, the gate 45 is open and the gate 44 is closed. The multivibrator may be controlled and synchronized in an extremely accurate fashion by an input or control signal applied at the input terminal 50 from a suitable stabilized sync signal generator (not shown) which occurs at a frequency of 756,000 cycles per second, this being twice the period of the multivibrator 47. Consequently, the multivibrator 47 has its alternate half cycles precisely timed under the control of the pulse applied at the terminal 50. The multivibrator output wave which is supplied on the conductors 48 and 49 is illustrated in idealized form by the curve *c*.

It should be noted here that apparatus for generating all of the frequencies and waveforms whose production is here mentioned is fully described in a United States patent application filed concurrently with this by the same inventors, Robert J. Stahl and Norman L. Heikes, entitled "Color Television Synchronizing Apparatus." References herein to the "color sync generator" refer to equipment there described, but other sources of the frequencies illustratively mentioned herein can be used.

The frequency of the multivibrator 47 being three-eighths the color repetition rate it reverses potential every one and one-third color cycles, and hence, acting through the gates, it effectively reverses the phase of the coded tracking signal for each four image filter strips scanned by the camera beam. If the reversals are phased as indicated by the arrows above the top line of Fig. 7, the output wave, after the periodic reversals, will be as shown in curve *d* of Fig. 4. By comparison with the spacing of the filter strips as indicated at the top of this figure it will be seen that the dominant frequency in the resultant wave is the repetition frequency of any one color, i. e., it is the "one megacycle" frequency which has been mentioned above. Further, it will be seen that in the resultant wave negative peaks always coincide with a red strip on the filter, while the peaks corresponding to blue and green strips are always positive. Also it will be observed that these negative peaks are sometimes generated by the presence of a red signal and at other times by its absence and a following phase reversal, so that it cannot be generated accidentally by scanning a red background, for example. Hence this "red" signal can safely be used for phasing as described in the concurrently filed application elsewhere mentioned.

The waveform *d* of Fig. 4, fed from the gates 44 and 45 to lead 53, is passed through a one megacycle band-pass filter 58 which removes both the harmonics and the minor 378 kilocycle component which it contains, yielding the substantially pure 1008 kilocycle sine wave illustrated at 59 by the curve *e* of Fig. 4. Its frequency is dependent on the linear velocity of the scanning beam of the camera, its phase on the instantaneous position of the beam with respect to the filter strips. It is supplied to a discriminator 61, and also, through a wave shaper 60, to a second pair of gates 64 and 65. Both discriminator and wave shaper will presently be described. The signal to the gate 64 is supplied through lead 66 and a phase inverter 67, in opposite phase to the signal to gate 65 which arrives directly through lead 68. The gates are opened and closed alternately and in phase by the same signals from the multivibrator 47 which actuates gates 44 and 45. The outputs from gates 64 and 65 are combined to resynthesize the coded tracking signal.

The output of the filter 58 in the form of the "one megacycle" wave, above mentioned, is compared in the discriminator 61 with an input wave applied at the input terminal 69 and supplied by way of the conductor 70 to the discriminator unit. This input control or comparison wave is developed at an accurately stabilized frequency of 1,008,000 cycles per second from the color sync generator above referred to.

The error signal developed by discriminating one of the inputs to the discriminator against the other is then mixed into the horizontal or line deflection circuit in such direction as to increase or decrease (as the case may be) the rate of scanning and thus compensate for any frequency or phase difference between the wave output from the filter 58 and that supplied at the input terminal 69. This error signal, from the discriminator, is available on the conductor 71.

The discriminator circuit may be of any well known form in which the output indicates a difference between two inputs with respect to each other, and its direction. It may be any of the general types used for signal indication in FM receiver circuits, for the automatic frequency control often used to adjust sound broadcast receiver oscillators to produce the correct heterodyning frequency, or for deflection frequency control in television receivers. Hence it need not here be illustrated.

The "one megacycle" tracking signal developed as above described is of the same frequency as the repetition rate of one color, and its phase is so defined that a selected portion of the cycle is always representative of the same color, as, for instance, the point in the cycle where red is present. Consequently, automatic color phasing is readily provided.

The output of the discriminator 61, as supplied to the lead 71, is made available to correct the velocity of the scanning beam through two different paths which are open to it alternately. The first of these paths leads through a gate 72 to a mixer 73. The other path leads through a second gate 74 to a memory capacitor 75 which also feeds into the mixer 73. The gates 72 and 74 may be of the same general type as those already referred to. They are operated in alternate phase by a keying pulse which is supplied at line frequency from the color synchronizing generator described in the co-pending application already referred to. This keying pulse is supplied to terminal 76 and passes directly to the gate 74, opening this gate for approximately the first 10% of the time required for scanning each line. The same pulse is also fed to a phase inverter 77, also of a type which has previously been described, which feeds the horizontal keying pulse in reverse phase to gate 72, closing it during the period when the gate 74 is open.

The impedance of the discriminator is low in comparison with that of the memory capacitor, and therefore the magnitude of the voltage supplied by the discriminator is substantially unaffected by the memory capacitor's addition to or subtraction from the circuit.

The mixer 73 is an adding circuit of known type. To it is supplied by way of lead 83 a sawtooth horizontal scanning voltage developed in the horizontal discharge tube of the standard monochrome camera 13. In the mixer this voltage is added to that from the discriminator, either directly or through the memory capacitor, and the resultant is fed through lead 84 to the horizontal scanning amplifier of the camera. The addition is in such phase that if the "one megacycle" signal developed by the tracking pattern lags behind the signal of like frequency developed by the color generator, the error voltage increases the deflection of the beam and causes it to catch up, thus bringing the two voltages into phase. Conversely, if the speed of the scanning beam becomes too high the error voltage is supplied through the mixer in such direction as to slow it down, again causing a rephasing. The waveform supplied by a standard type of scanning generator is very nearly linear, although not sufficiently so that it may be relied upon to give an absolutely constant speed of scan as required for accurate color presentation. However, if the discriminator is capable of supplying a correction voltage which will vary the speed of the scanning beam by 10% the correction provided will be more than ample. Owing to blanking, as well as the different velocity of the fly-back, which would upset the process in any event the discriminator loses control during the fly-back period. For a few lines this might be unimportant, but there may be a cumulative error in the camera scan which would cause difficulty when considered over an entire field. The memory capacitor is provided in order to take care of this situation.

During the first 10%, approximately, of each line it accurately follows the discriminator voltage, applying it to the mixer. When the gate 74 closes, however, it retains the charge that it has acquired, which continues to be applied to the mixer in addition to a differential voltage directly from the discriminator through gate 72, which may vary up and down in the meantime. During the fly-back, however, the voltage applied from the discriminator directly through gate 72 falls off substantially to zero, and at the start of the following line the memory capacitor takes control so that this line starts immediately under the starting position of the preceding line. Gate 74 then opens and the voltage developed by the discriminator as the sweep of the new line progresses is added to or subtracted from the potential on the memory capacitor so that when gate 74 closes again the voltage has been stabilized for the new condition.

From the fact that the memory capacitor is for the specific purpose of correcting non-linearities which may accumulate from line to line vertically over the entire field it is clear that it is undesirable that this same sort of correction should occur from field to field; what is desired in this case being that a succeeding field should start where the last one did with the oscillator running freely. Provision is therefore made for discharging the memory capacitor at the beginning of each field. This is accomplished by means of a discharge tube 85 which is actuated by a pulse supplied to terminal 86 from the standard synchronizing generator as used in ordinary monochrome transmissions. The discharge tube 85 may be of the same general character which is normally used to supply sawtooth waves for scanning purposes. Each new field therefore starts at the same point as the preceding field. The camera scan is, as is customary, arranged so that camera field blanking is removed slightly before the transmitted blanking pulse ceases. The camera therefore has several lines in which to reestablish synchronism prior to the removal of the transmitted blanking pulse and the transmission of the picture signal.

As a result of the equipment so far described the compound signal developed by the camera is fed through the lead 41 to the mixer 42 with the tracking signal in substantially exact phase and amplitude. In the mixer it is combined with the same waveform in reverse phase and equal amplitude, thus cancelling out the coding signal and sending forward, to the television transmitter, a substantially uncontaminated video signal.

Figure 9:
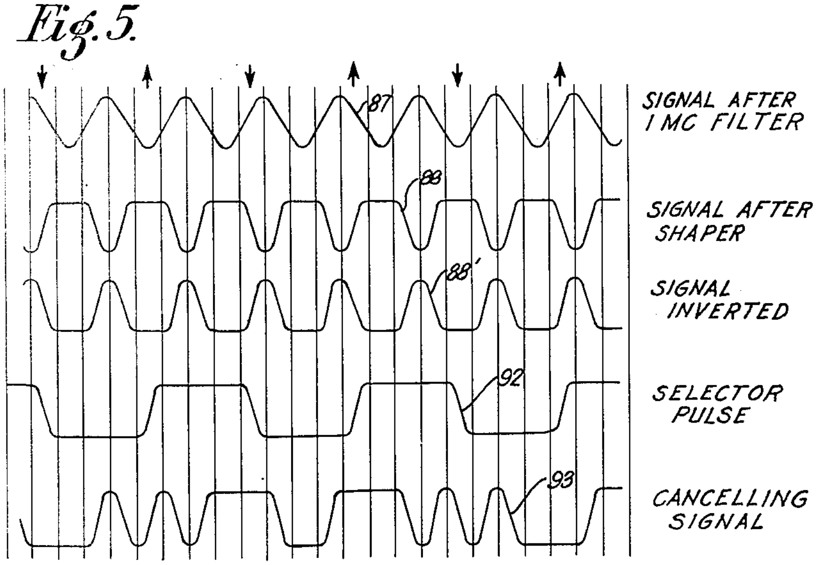
Fig. 9 is a series of curves showing waveforms used in resynthesizing one form of tracking signal.

As has been indicated the "one megacycle" wave delivered by the filter 58 has substantially a pure sinusoidal form. A portion of this wave is passed through the shaper 60. In the shaper this wave is passed through a class C amplifier, i. e., one biased below cutoff, which amplifies the positive half cycles only, inverting them in the process, and thus converting the one megacycle sine wave shown in curve 87 of Fig. 9 to that shown in curve 88 of the same figure. This waveform is passed to the gates 64 and 65, as before mentioned. The latter gates are operated, as was indicated above, by the 378 kilocycle wave form from the multivibrator 47, but before being passed on to the gates 64 and 65 these waves are passed through four megacycle low pass filters 89 and 91 which convert the previously sharply angular selector wave as fed to gates 44 and 45 to one having a more rounded contour as shown in curve 92 of Fig. 9. As a result, when the waveform shown in curve 88 is periodically reversed by the waveform 92, the waveform developed is that indicated by curve 93 of Fig. 9 which, it will be seen by comparison with Fig. 4, is substantially identical with the tracking code wave developed by the camera. Fed, in proper phase, to the mixer 42, this cancels the tracking code wave from the signal, giving the results desired.

Figures 1A, 2:
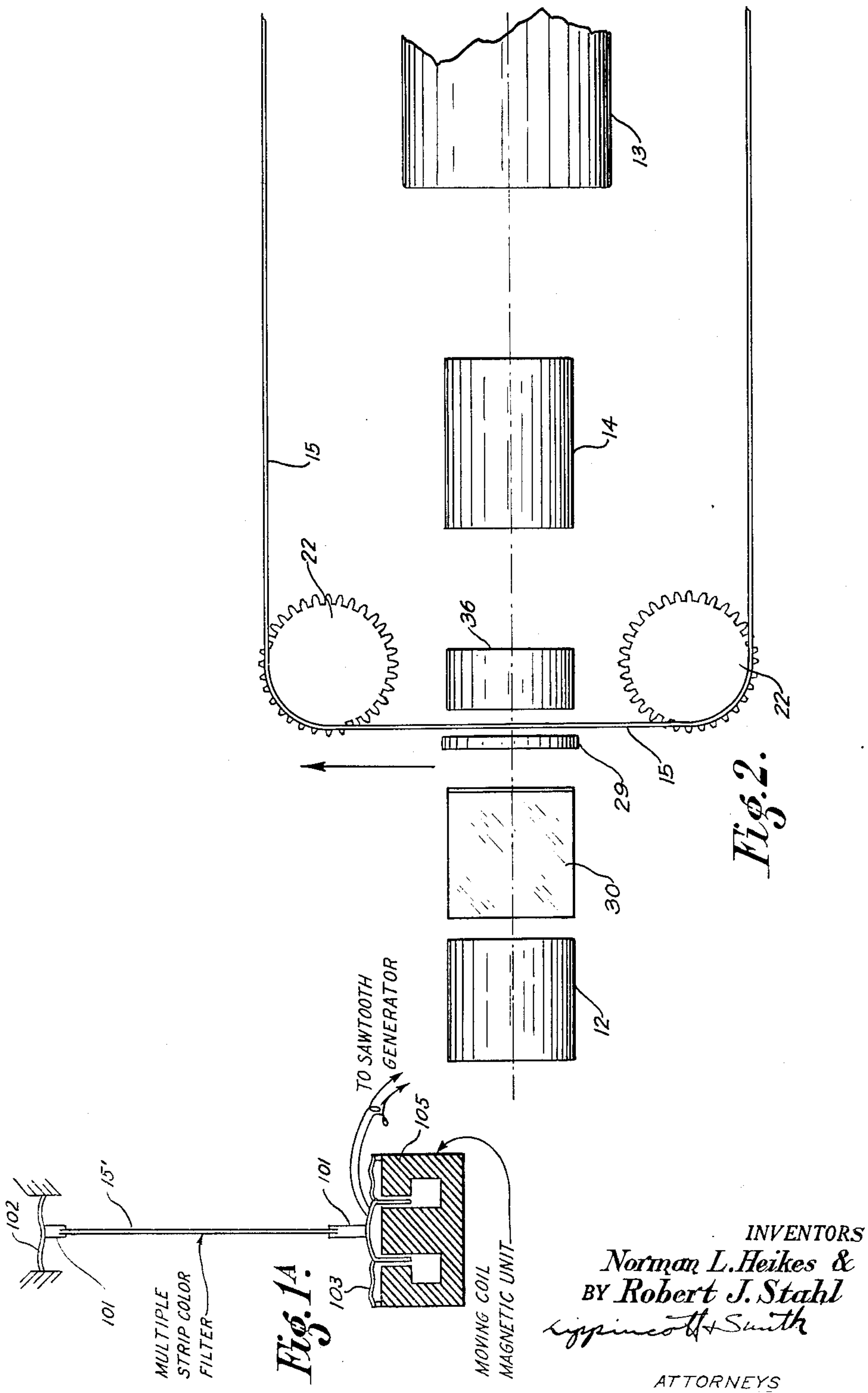
Fig. 2 is a diagrammatic side elevation of the apparatus of Fig. 1.

While the equipment as above described is that which we prefer, as lending itself particularly to present types of standard black-and-white television equipment and as providing a video signal which may be transmitted substantially without degradation of detail or color contamination and with a minimum of "color cross-talk," which would dilute the purity of the reproduced colors, many modifications are possible within the scope of the invention. The pattern produced on television receivers through the use of the frequencies and dimensions given is the one which we believe to be the most favorable, but through minor modifications of the equipment, many other patterns, some of them very good, may be employed. One method of producing these alternative patterns is by slanting the variously colored areas of the color filters diagonally across the picture field. This results in a less rapid transition as between colors, which is undesirable where a direct transmission of the color signal from the camera to the television transmitter is used, as in the preferred form of the invention, but it need be of no disadvantage if sampling processes are to be used. Such slanted color strips may be employed with camera tubes having a relatively long storage period provided the continuous type of film motion is used and the film drive is tilted so that the strips progress in their own direction. With types of camera tube having little or no storage capacity the oscillating or reciprocating type of filter drive may be employed. In this case there may be substituted, for the selsyn motor and sprockets driving a continuous film strip, a moving coil motor of the type familiar in loudspeaker drives. Such a modification is illustrated in Fig. 1A. In this figure a film 15', upon which the color strips of the two filter sections are carried, can be a small rectangle mounted in a light frame 101, preferably of aluminum or magnesium. This frame is mounted in resilient supports 102 and 103 and is caused to oscillate or reciprocate transversely across the plane of the image formed by the main objective lens 12. A drive to produce this motion is produced by a moving coil unit 105, which should preferably be of low impedance and supplied by a low impedance source and hence be highly damped. A sawtooth wave, generated by any of various well known types of generator (not shown) is fed to the moving coil at a frequency which is an integral submultiple of the field scanning frequency, and at an amplitude which will move the frame and both filters with it at a rate which bears a simple fractional relation to the width of one filter strip per field, the width being measured in the direction of motion. When used with vertical filter strips motion of this character is likely to produce visible structure or crawl in the picture field, but with diagonal strips almost any pattern desired may be used, provided the color repetition frequencies and strip widths be properly chosen.

Figure 5:
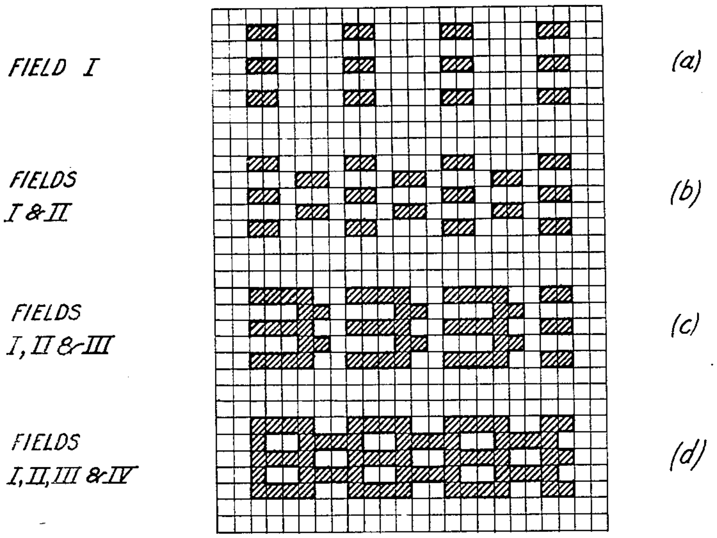
Fig. 5 is a diagram illustrating the pattern in which the segments of a selected color are displayed upon the picture area of a receiver in successive field scannings of such area.

There are a number of reasons for our preference for the use of the specific frequencies and tracking patterns which have here been described in detail. One of these reasons lies in the nature of the pattern wherein the line segments of the various colors are distributed over the picture field. This is illustrated in Fig. 5, wherein the rectangles in the upper group represent the segments of any one specific color as distributed in portions of the first three lines scanned, i. e., lines 1, 3 and 5 of the first or odd order scanning field. The second group of rectangular blocks shows how the segments of the same color are interspersed between those of the first field as the intervening even order lines are scanned. The third and fourth groups add, successively, the segments as distributed in the third and fourth fields respectively, those segments traced in the preceding fields being retained in the successive groups to show the manner in which the field fills up. The final two fields are not illustrated, as it is obvious how the blank spaces left in the odd lines after the fourth field was scanned would be completely filled in field 5 and those in the even lines in field 6.

This pattern has the advantage that the segments of any specific color in each even line field come exactly intermediate those of the same color in the odd field. Furthermore, the field is two-thirds filled with each color in a completely uniform distribution in the normal period of the persistence of vision. As flicker is a function of the size of the flickering area and as the areas of any one color are of the order of magnitude of the smallest areas which the eye can resolve (as the screen is normally viewed) and well below the size wherein the eye can resolve color, no flicker whatever can be perceived unless the observer is extremely close to the screen.

Another advantage of this system is that the length of the color segments and the frequencies generated by them are such that the full resolvable detail which the frequency band allotted to this system permits can be reproduced in each color with a minimum of cross-talk or spurious structure. To do this requires that the highest transmissible harmonic of the color repetition frequency (in this case the fourth) lie near the upper limit of the frequency band. In the preferred system the harmonic of this repetition frequency is not present in the waveforms produced, either by the compound waves generated in the camera or the video waves actually transmitted. For this reason the third harmonic, at a frequency of approximately three megacycles, can be transmitted continuously with the video signal for color synchronization and by a reversal of phase between fields as described in our concurrently filed application, the synchronizing signal will be invisible on the receiver screen. As is shown in the co-pending application of the present inventors above cited, all the frequencies required to maintain color synchronism and phase can be readily generated, and with those chosen and here set forth there are no ambiguities which would lead to false color presentation.

Finally, the type of signal generated by the preferred system can be detected, color selected and phased, and presented to the observer by a system of extreme circuit simplicity when used with any of the types of direct-view tubes which have been publicized to date and the system is also quite feasible for use with the multi-tube systems wherein each color is displayed on a separate tube and the images are optically combined.

For all of these reasons we prefer to use the relative values which have here been given in detail. As has been pointed out, however, the invention is subject to many modifications by those skilled in the art without departing from its scope as defined in the following claims.

We claim:

1. An optical system adapted for use in television cameras comprising an optical picture-filter consisting of a multiplicity of areas of differing optical transparency to light of differing characteristics, a tracking grid comprising a differently arranged multiplicity of areas of dimensions integrally related to said filter areas and of differing light reactive characteristics, means for projecting an image of said tracking grid upon said picture filter, means for simultaneously projecting an image of a picture field upon said filter, and means for projecting a real image of said filter as illuminated by both of said previously mentioned images.

2. An optical system in accordance with claim 1 wherein said tracking grid projecting means produces an image of said grid areas with the edges thereof substantially in register with the edges of said filter areas.

3. An optical system in accordance with claim 1 wherein said tracking grid comprises an optical filter.

4. An optical system in accordance with claim 1 wherein the areas of said optical filter comprise colored strips of additive primary colors arranged in a regularly recurring cycle.

5. An optical system in accordance with claim 4 wherein said filter comprises a band of flexible film bearing thereon successive sections of filter strips, said strips being arranged in the same cyclic order in successive sections but transposed laterally with respect to the strips in preceding and succeeding sections, and means for interposing said successive sections in the path of said picture image.

6. An optical system in accordance with claim 4 including means for periodically varying the positions of the color constituting said cycle relatively to the image of said picture field.

7. An optical system in accordance with claim 6 wherein said position varying means brings a filter strip of each color of said cycle in turn into coincidence with each area of the image of said picture field.

8. An optical system in accordance with claim 5 wherein said interposing means comprises means for driving said band at a substantially constant speed.

9. An optical system in accordance with claim 1 including means for moving said filter and the image of said tracking grid in register therewith transversely with respect to the vertical of the image of said picture field.

10. A system in accordance with claim 6 wherein said moving means comprises an electro-mechanical transducer of the moving-coil type.

11. An optical system adapted for use in a color television camera comprising a main objective lens for projecting an image of a picture field in a specific plane, an optical filter positioned in said plane comprising a multiplicity of strips successively of different additive primary colors cyclically arranged, means for periodically shifting the positions of strips constituting the said cycle to register with different parts of the image of said picture field, a tracking grid comprising colored strips differently arranged from said filter strips, means for projecting an image of said tracking grid on said filter in superposition with an image from said main objective including means for illuminating said tracking grid, a tracking objective mounted with its axis substantially normal to the axis of said main objective, and a partially transmitting mirror interposed at an angle of substantially 45° to both of said axes at the intersection thereof between said main objective and said filter; and a second objective positioned to produce a real image of said filter as illuminated by both of said previously mentioned images.

12. An optical system in accordance with claim 11 wherein said optical filter comprises a band of flexible material having sections each comprising strips of primary colors cyclically arranged, said sections being similar except for a lateral displacement of said cycle in each section with respect to its position in adjacent sections, and means for moving said band continuously substantially in the plane of the image of said picture field to bring said sections successively into position for illumination by said image.

13. An optical system in accordance with claim 12 wherein the direction of the strips on said band is in the direction of motion of said band.

14. An optical system adapted for use in a color television camera comprising a main objective lens for projecting an image of a picture field in a specific plane, an optical filter positioned in said plane comprising a multiplicity of strips successively of different additive primary colors cyclically arranged and a resilient mounting for said filter flexible in the dimension of said plane and transverse to the direction of said strips, an electro-mechanical transducer mechanically connected to oscillate said filter in its resilient mountings, a tracking grid comprising colored strips differently arranged from said filter strips, means for projecting an image of said tracking grid on said filter in superposition with an image from said main objective including means for illuminating said tracking grid, a tracking objective mounted with is axis substantially normal to the axis of said main objective, and a partially transmitting mirror interposed at an angle of substantially 45° to both of said axes at the intersection thereof between said main objective and said filter; and a second objective positioned to produce a real image of said filter as illuminated by both of said previously mentioned images.

15. An optical system in accordance with claim 11 including a field lens adjacent the plane of said optical filter for redirecting light passed by said first objective lens into said second objective lens.

16. An optical system in accordance with claim 15 wherein said field lens is of the Fresnel type.

17. An optical system in accordance with claim 1 wherein said filter areas are arranged in a cyclic sequence passing successively light of three additive primary colors and said tracking grid comprises areas so dimensionally related to said filter areas that the edges of the tracking grid image areas may be brought into substantial registration with the edges of said filter areas, the colors of said tracking grid areas being so chosen with respect to the colors passed by said filter areas as to be alternately passed and stopped by said filter in a recurring cycle having a fundamental period differing in length from the color cycle of said filter.

18. In sequential color television apparatus wherein successive lines of a picture field are scanned at a substantially constant rate to produce signals wherein consecutive equal time intervals are representative of different primary color components of said field in a repetitive cycle, signal generating apparatus comprising in combination with a camera tube having a photosensitive surface to receive an optical image of the picture field and cathode ray scanning means to develop therefrom output signals representing the image, means for projecting an image of the picture field on said photosensitive surface, a color filter comprising areas of equal dimension in the direction of said scanning lines interposed in the path of said image, said areas passing respectively the consecutive component colors of said cycle to break said image into homologous areas each representative of a single color component, means to generate and supply sawtooth waves at line frequency to said scanning means, a wave shape control to modify the form of said waves to equalize the time of scanning the color areas of said image comprising means for projecting a color pattern through said filter and in register therewith such that successive portions along the direction of the scanning lines will be passed and stopped by said filter in segments of light and shade whose length is integrally related to that of said filter areas, said segments being combined in alternate groups of similar pattern but with the light and shade segments therein reversed; an output circuit for said camera tube, a branch circuit connected to said output circuit, switching means in said branch circuit for periodically reversing the phase of currents therein, means for generating a comparison frequency period whereof integrally related length of said intervals, means timed with said comparison frequency for actuating said switching means at epochs corresponding to the length of said groups of segments, thereby producing in said branch circuit a wave component of a frequency approximately equal to that of said comparison frequency, a wave filter responsive to said comparison frequency connected to said branch circuit, a discriminator connected to the output of said wave filter and fed by said comparison frequency for developing an error signal dependent on the difference in phase between said wave component frequency and said comparison frequency, and means for combining said error signal with said sawtooth wave to correct any errors in the rate of scan produced thereby.

19. Apparatus in accordance with claim 15 including means for injecting into said output circuit a component of equal amplitude and opposite phase to that produced by scanning the areas of light and shade produced by said pattern.

20. Apparatus in accordance with claim 15 wherein said optical filter comprises parallel strips and said pattern comprises strips of different colors parallel to the strips of said optical filter.

21. Apparatus in accordance with claim 15 wherein said optical filter comprises parallel strips and said pattern comprises strips of different colors parallel to the strips of said optical filter, the width of each of said filter strips in the direction of the scanning being substantially equal to eight-thirds that of the minimum resolvable areas of the picture field.

22. Apparatus in accordance with claim 18 including means for displacing the colors of said optical filter strips to the image of said picture field between successive scannings thereof.

23. In combination with a television camera having a photosensitive surface for receiving an image and developing therefrom electrical charges representative thereof and scanning means for developing from said charges electrical signals representative of the variations of light and shade along lines crossing said image in the direction of scanning, means for dividing such image along each of said lines into successive segments illuminated by different component colors of said image in a repeating cycle, means for projecting on said photosensitive surface a pattern of light and shade in a repeating cycle of different period from said component color cycle but integrally related to the length of said segments and in register with the edges thereof to produce in said signals a characteristic component independent of the signals produced by scanning said image, means for deriving from said component signals a signal of approximately a desired constant frequency, means for generating a wave of said desired frequency, a discriminator fed by said derived signal and said generated wave and deriving therefrom an error signal dependent on any discrepancies therebetween, and means for applying said error signal to so vary the scanning rate as to correct such error.

24. A tracking control for color television apparatus wherein an image of a subject to be analyzed is scanned along a series of substantially parallel linear paths of which the complete scanning is repeated at a rate at least as high as that necessary to maintain visual persistence and wherein the optical image to be analyzed is projected through a repeating color cycle of color filter strips extending in a direction transverse to the linear scanning paths and wherein the width of each filter strip is less than one-sixth that of the scanning line length and wherein there is projected in superposition upon the optical image sequence a coded tracking image sequence of such characteristic that successive portions thereof along the direction of linear image analysis are passed and stopped by the color filter strips in segments of light and shade which are integrally related to the length of individual color filter segments comprising means to establish a primary control over the rate of scanning along each linear path; means to derive from the compound scanning output signals of image and code indications a signal representative of the instantaneous scanning rate and phase; means separately to produce signals precisely timed to coincide with an optimum color scanning cycle; means to compare the separately generated and the derived signals; means to produce a secondary control signal from the signal comparison; means to combine the secondary control signal with the primary control signal to modify thereby the instantaneous scanning rate; means for deriving from the signals resulting from scanning a signal indicative of only the code signal; and means for combining the derived code signal with the compound signal in such phase relationship and amplitude with respect to the compound signal as to remove the originally-produced code signal from the compound signal and an output circuit to receive the compound signal minus the code additions.

25. A tracking control for additive color television apparatus wherein an image of a subject to be analyzed is scanned in a succession of fields each including a series of substantially parallel linear paths with the field scanning being repeated at a field rate at least as high as that necessary to maintain visual persistence and wherein the optical image to be analyzed is projected through a repeating series of adjacent additive component color filter strips each extending in a direction transverse to the linear scanning path and wherein the width of each filter strip is a minor fraction only of the scanning line length and wherein there is superimposed upon the optical image sequence so projected a coded tracking image sequence of such characteristic that successive portions thereof along the direction of linear image analysis are passed and stopped by the color filter strips in segments of light and shade which are integrally related to the length of individual color filter segments comprising means to exert a primary control over the rate and phase of scanning along each linear path; means to produce during each scanning compound output signals representing both code and image intelligence, means to derive signals indicative of the instantaneous scanning rate from a portion of the compound scanning output; means separately to produce signals precisely timed to coincide with an optimum color scanning cycle; means to discriminate the separately generated and the derived signals relative to each other; means to derive a secondary control signal from the discrimination; means to combine the secondary control signal with the primary control signal to modify thereby the instantaneous scanning rate; means for deriving a signal indicative of the code signal only from the compound signals resulting from scanning; means for combining the derived code signal in such phase and amplitude relationship with respect to a second portion of the compound signal that the originally-produced code signal is removed from the compound signal to leave only an image signal; and a load circuit to receive the said image signal.

26. The tracking control claimed in claim 25 comprising, in addition, capacitive hold-over means connected to receive the control signal and to control the initiation of each successive scanning line with respect to the start of the line preceding.

27. The tracking control claimed in claim 26 wherein the hold-over control period is approximately the period intervening between the initiation of one scanning trace and that of the next succeeding scanning trace.

28. The tracking control claimed in claim 26 comprising, in addition, means to restore the capacitive hold-over means to a normal charge state during time periods intervening between successive field scanning repetitions.

29. The tracking control claimed in claim 25 comprising, in addition, a band pass filter having a pass range substantially corresponding to that of the color repetition rate and bearing a non-integral relationship to the frequency of stoppage and passage of light and shade in the coded tracking image sequence for producing a secondary control tracking signals.

30. The tracking control claimed in claim 25 comprising, in addition, a mixer for combining the primary and secondary control energies to develop a scanning stabilizing control signal to advance and retard the linear scanning rate upon slowing and speeding respectively of the actual scanning rate relative to an optimum rate.

31. The tracking control claimed in claim 25 wherein the means to produce the signals indicative of the instantaneous scanning velocity and phase comprises a pair of gate circuits each having separate inputs and a common output, means for supplying the compound image and code signals to the gates in opposite phase, and means to key the gates to an operative state alternately at a rate substantially eight-thirds the color repetition frequency of the adjacent color strips.

32. The tracking control claimed in claim 25 wherein the means to produce the signals indicative of the instantaneous scanning velocity and phase comprises a pair of gate circuits each having separate inputs and a common output, means for supplying the compound image and code signals to the gates in opposite phase, and means to key the gates to an operative state alternately at a rate which bears a non-integral relationship to the color repetition frequency.

33. In color television apparatus, a filter comprising a grid-like structure having a plurality of strips of cyclically repeating sequences of the component colors red, blue and green in combination with a tracking filter sequence having a plurality of substantially like width color strips of a number no greater than the total number of image filter strips, the strips of the tracking filter sequence individually including colors corresponding to the colors of the image filter section, the complementary colors thereof, and transparencies and opacities.

34. The filter claimed in claim 33 wherein selected adjacent strips of the tracking filter are of like spectral color transmission characteristics.

35. In color television apparatus, a color filter comprising an image filter sequence including a plurality of elongated adjacent strips of cyclically repeating colors chosen from the group including green, red and blue, in combination with a tracking filter sequence including a plurality of color strips of width corresponding to those of the image filter sequence and of a number comprising at least eight times the number of colors for each cycle of individual color filter strips, the tracking filter sequence being arranged to include strips of colors corresponding to each color of the image filter sequence, to the complementary of each color of the image filter sequence, and complete transparencies and opacities.

36. The filter claimed in claim 35 wherein selected strips of the tracking filter are of like spectral transmission characteristics.

37. A color filter for use in color television apparatus wherein an optical image is analyzed along a series of linear paths each divided into segmental portions of a cyclically repeating color sequence chosen from the primary or component colors of green, red and blue, comprising an image filter sequence including a multiplicity of strips formed in repeating cycles of green, red and blue, and comprising also a tracking filter sequence of a plurality of strips each of a width corresponding substantially to those of the image filter sequence and being in the color order cyan, green, black, red, red, yellow, green, cyan, cyan, white, yellow, red, red, purple, white, cyan, cyan, blue, purple, red, red, black, blue and cyan, with the initial cyan strip substantially alined in space with a green strip of the image filter sequence, the first green strip of the tracking filter sequence being alined with a red strip of the image filter sequence, the initial black strip of the tracking filter sequence being alined with a blue strip of the image filter sequence, and the remaining tracking filter sequence strips being alined respectively with strips of the image filter sequence in the colors of green, red, blue, green and so on.

38. A filter for color television camera apparatus comprising a pliable film having two generally adjacently-positioned sets of light-transmitting strips laterally separated thereon, the first set of strips including a plurality of substantially like-width and -length areas of differing spectral transmission selected from the colors red, blue and green repeating in a cyclic order, the other set of strips including a plurality of areas of substantially like length and of widths variable within a unit range between one and six times the width of the individual strips of the first set, the second set of strips also being transparent to various spectral colors and including colors selected from the group of colors in the first set of strips, colors selected from those colors which are complementary to those of the first set, as well as complete transparencies and complete opacities, the colors of the second set being arranged also in a cyclically-repeating sequence such that the cycle repeats following a total strip width greater than that width included within one cycle of the first set.

39. A filter for color television camera apparatus comprising a pliable film transparency having two generally adjacently-positioned sets of light-transmitting strips of selected spectral character laterally positioned thereon, the first set of strips including a plurality of substantially like-width and -length areas of differing spectral transmission chosen from the colors red, blue and green repeating in a cyclic order, the other set of strips including a plurality of strips of like length and widths, the second set of strips also being transparent to various spectral colors and including colors selected from the group of colors in the first set, colors complementary to those of the first set, complete transparencies and complete opacities, the colors of the second set being arranged also in a cyclically-repeating sequence wherein adjacent strips may be of like color and wherein the color cycle repeats after a strip width greater than that width included within one cycle of the first set.

40. A filter for color television camera apparatus comprising a pliable film transparency having two generally adjacently-positioned sets of light-transmitting strips of selected spectral character laterally positioned thereon, the first set of strips including a plurality of substantially like-width and -length areas of differing spectral transmission chosen from the colors red, blue and green repeating in a cyclic order, the other set of strips including a plurality of strips of like length and widths, the second set of strips being selected to include strips transmitting at least a plurality of the colors red, blue, green, yellow, cyan, purple and white, as well as light opaque strips interrupting light transmission and wherein adjacent strips may have like spectral transmission properties, the second set of strips being arranged to repeat in a cyclic order following a film strip width greater than that corresponding to the strip widths of the strips forming a single color cycle of the first set of strips.

41. A filter for color television camera apparatus comprising a pellicle having two generally adjacently-positioned sets of light-permeable strips, the first set including a plurality of substantially like-width and -length areas of differing spectral transmission in the colors red, blue and green in a selected cyclic order and in repeating cycles, the other set comprising a plurality of strips of a number per unit length no greater than the total of those of the first set, the second set being also transparent to various spectral transmissions of the group of strips selected from colors of the first set, colors complementary to those of the first set, complete transparencies and complete opacities, all arranged in codified manner relative to the colors of a plurality of cycles of the first set.

42. The filter claimed in claim 41 wherein the pellicle is an elongated film and comprises, in addition, a plurality of additional sets of similarly adjacently-positioned light-permeable strips longitudinally and progressively spaced from the first adjacently-positioned sets, each of the longitudinally-spaced adjacent sets being displaced transversely of the pellicle with respect to preceding and succeeding adjacently-positioned sets such that like colors are displaced by distances changed from set to set within a repeating cycle by amounts within the film width comprising one complete repeating cycle of the colors red, blue and green.

43. A filter for color television camera apparatus comprising a pellicle having two generally adjacently-positioned sets of light-permeable strips, the first set including a plurality of substantially like-width and -length areas of differing spectral transmission in the colors red, blue and green repeating in a selected cyclic order, the other set comprising a plurality of strips of a number of which the maximum corresponds to the number in a unit length of the first set, the second set being also transparent to various spectral color values including selected colors of the first set, colors complementary to those of the first set and being so arranged in a cyclically repeating sequence that when superimposed upon the strips of the first set light of the spectral colors will be transmitted and interrupted in codified manner.

NORMAN L. HEIKES.
ROBERT J. STAHL.

REFERENCES CITED

The following references are of record in the file of this patent:

UNITED STATES PATENTS

| Number | Name | Date |
|---|---|---|
| 2,165,168 | Hardy | July 4, 1939 |
| 2,253,086 | Murray | Aug. 19, 1941 |
| 2,296,908 | Crosby | Sept. 29, 1942 |
| 2,389,979 | Huffnagle | Nov. 27, 1945 |
| 2,415,059 | Zworykin | Jan. 28, 1947 |
| 2,416,918 | Goldsmith | Mar. 4, 1947 |
| 2,452,293 | De Forest | Oct. 26, 1948 |